Patented July 18, 1933

1,918,648

UNITED STATES PATENT OFFICE

ERNST KORTEN, OF FRANKFORT-ON-THE-MAIN-FECHENHEIM, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PROCESS FOR MANUFACTURING AR-TETRAHYDRONAPHTHOL ETHERS

No Drawing. Application filed December 2, 1928, Serial No. 323,586, and in Germany December 6, 1927.

The present invention relates to a process for manufacturing ar-tetrahydronaphthol ethers and to the new ar-2-alkoxy-tetrahydronaphthalenes obtainable thereby.

I have found that by treating naphthol-ethers of the general formula $$C_{10}X_{8-n}(O\text{-alkyl})_n,$$

wherein the X's mean hydrogen or monovalent substituents and $n$ means the number 1 or 2, with hydrogen in the presence of a base metal hydrogenation catalyst, in a smooth reaction practically without the formation of by-products, ar-tetrahydronaphthol ethers are obtained corresponding to the general formula:

$$C_{10}H_4X_{8-n}(O\text{-alkyl})_n,$$

wherein the X's and $n$ have the aforesaid signification and the ether groups are attached to the aromatic not hydrogenated nucleus. The result of this process of mine is a quite unexpected one, since usually, when hydrogenating naphthols, the nucleus containing the hydroxy-group is hydrogenated and on the other hand, when hydrogenating in the presence of a noble metal hydrogenation catalyst, generally entirely hydrogenated products are obtained. My process of hydrogenation is advantageously carried out in the presence of an organic diluent.

Nearly all the ar-tetrahydronaphthol ethers obtainable by my present process are unknown hitherto. They may be employed as perfume ingredients because of their agreeable fruit-like scent and also as starting materials for the manufacture of dye-stuffs and pharmaceutical products.

In order to further illustrate my invention the following examples are given, the parts being by weight and all temperatures in centigrade degrees. But I wish it to be understood that I am not limited to the particular conditions nor to the specific products mentioned therein.

Example 1

350 parts of α-naphthol-methylether of the formula:

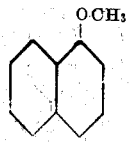

100 parts of tetrahydronaphthalene and 7 parts of a nickel containing catalyst previously reduced by means of hydrogen are heated together with hydrogen under pressure in an autoclave provided with a stirrer. The absorption of hydrogen begins under a pressure of about 50 atmospheres already at a few degrees above 50°. The mass is separated from the catalyst and distilled in vacuo. Under a pressure of 7 mm the added tetrahydronaphthalene passes over below 100°. Then the new ar-1-methoxy-tetrahydronaphthalene of the formula:

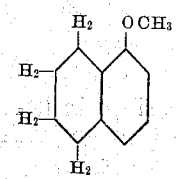

distils constantly at 113°. It is a clear easily mobile oil of an agreeable aromatic smell.

Example 2

200 parts of α-naphthol-ethyl-ether of the formula:

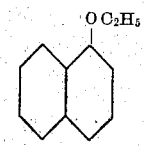

are heated with 4 parts of a reduced nickel catalyst and hydrogen under a pressure of 20–50 atmospheres in an autoclave provided with a stirrer. At about 70° a strong absorption of hydrogen begins. When an amount corresponding to 2 molecules of hydrogen is taken up, the reaction product is separated from the catalyst. It represents ar-1-ethoxy-tetrahydronaphthalene of the formula:

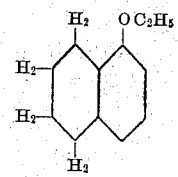

being a clear oil boiling at 122° under a pressure of 9 mm as described in literature (Berichte der deutschen chemischen Gesellschaft, vol. 23, page 217).

Example 3

500 parts of β-naphthol-methyl-ether of the formula:

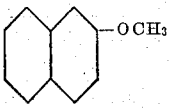

500 parts of decahydronaphthalene and 2.5 parts of a nickel containing catalyst are treated as described in the foregoing examples. The absorption of hydrogen begins at 60° under a pressure of 25-55 atmospheres. When 2 molecules of hydrogen are introduced, the reaction product is distilled in vacuo. After the decahydronaphthalene applied as a solvent has passed over, ar-2-methoxy-tetrahydronaphthalene of the formula:

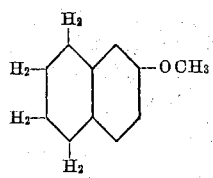

distils constantly at 118° under a pressure of 9 mm, as described in literature (Liebig's Annalen, vol. 426, page 121).

Example 4

When in Example 3 β-naphthol-methyl-ether is replaced by the corresponding ethyl-ether of the formula:

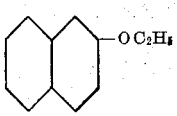

the new ar-2-ethoxy-tetrahydronaphthalene is obtained. It corresponds to the formula

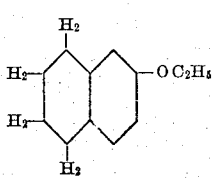

and represents an easily mobile oil of an agreeable fruit-like smell boiling at 123° under a pressure of 8 mm.

Example 5

150 parts of β-naphthol-n-propylether of the formula:

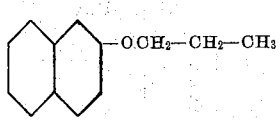

are heated with 2.25 parts of catalyst containing nickel and pumice under a hydrogen pressure of 30 atmospheres while stirring. The absorption occurs very quickly already at about 60° and is finished when 2 molecules of hydrogen are introduced. The new ar-2-n-propyloxy-tetrahydro-naphthalene thus obtained corresponds to the formula:

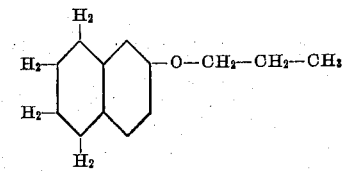

It represents a clear agreeably smelling oil boiling at 140° under a pressure of 10 mm.

Example 6

100 parts of β-naphthol-isopropylether of the formula:

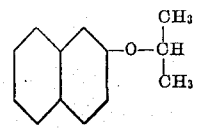

and 2 parts of a previously reduced catalyst containing nickel and kieselguhr are hydrogenated according to the foregoing examples. The formed new ar-2-isopropyloxy-tetrahydronaphthalene of the formula:

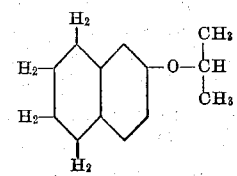

being a clear oil of an aromatic smell, boils under a pressure of 9 mm at 135-136°.

Example 7

β-naphthol-isobutyl-ether of the formula:

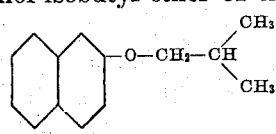

yields when treated in an analogous manner the new ar-2-isobutyloxy-tetrahydro-naphthalene of the formula:

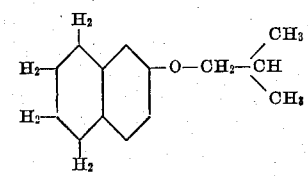

It boils under a pressure of 12 mm at 146-148° as a clear oil of a less strong aromatic smell.

Example 8

70 parts of 1.4-dihydroxy-naphthalene-dimethylether of the formula:

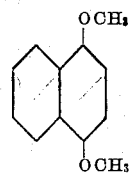

and 1 part of a catalyst containing nickel, cerium and pumice are hydrogenated in the above mentioned manner. The absorption occurs violently at about 80–90° and is finished when 2 molecules of hydrogen are taken up. The new ar-1.4-dimethoxy-tetrahydronaphthalene thus obtained corresponds to the formula:

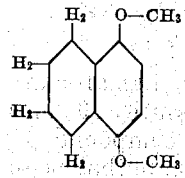

and represents an easily mobile oil boiling under a pressure of 5 mm at 138–140°.

*Example 9*

70 parts of 1-acetylamino-2-ethoxy-naphthalene of the formula:

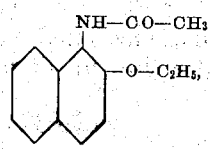

50 parts of decahydronaphthalene and 1.75 parts of a catalyst containing nickel and pumice are heated in an autoclave provided with a stirrer under a hydrogen pressure of 30–50 atmospheres. The absorption occurs very smoothly at 100–150°. The formed new ar-1-acetylamino-2-ethoxy-tetrahydronaphthalene of the formula:

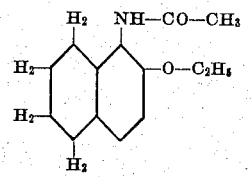

crystallizes from benzine in colorless fibers melting at about 149°. It yields when saponified for instance by means of hydrochloric acid in butylic alcohol ar-1-amino-2-ethoxy-tetrahydronaphthalene of the formula:

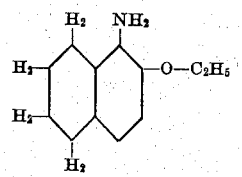

melting at 54–55° when recrystallized from benzine or methyl-alcohol.

I claim:

1. A process which comprises treating a naphtholether of the general formula:

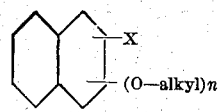

wherein X means hydrogen or an acylamino group, and $n$ means the number 1 or 2, with hydrogen in the presence of a base metal hydrogenation catalyst.

2. A process which comprises treating a naphtholether of the general formula:

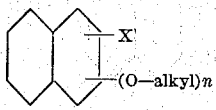

wherein X means hydrogen or an acylamino group, and $n$ means the number 1 or 2, with hydrogen under superatmospheric pressures in the presence of a base metal hydrogenation catalyst with the addition of an organic diluent.

3. A process which comprises treating a naphtholether of the general formula:

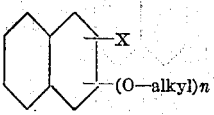

wherein X means hydrogen or an acylamino group, and $n$ the number 1 or 2, with hydrogen under pressures between about 20 and about 55 atmospheres and temperatures between about 50 and about 150° in the presence of a base metal hydrogenation catalyst with the addition of an organic diluent.

4. A process which comprises treating a β-naphtholether of the general formula:

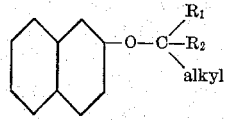

wherein $R_1$ and $R_2$ mean hydrogen or alkyl-groups, with hydrogen in the presence of a base metal hydrogenation catalyst.

5. A process which comprises treating a β-naphtholether of the general formula:

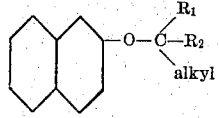

wherein $R_1$ and $R_2$ means hydrogen or alkyl-groups, with hydrogen under superatmospheric pressures in the presence of a base metal hydrogenation catalyst with the addition of an organic diluent.

6. A process which comprises treating a beta-naphtholether of the general formula:

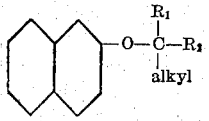

wherein $R_1$ and $R_2$ mean hydrogen or alkyl groups, with hydrogen under pressures between about 20 and about 55 atmospheres and temperatures between about 50 and about 150° in the presence of a base metal hydrogenation catalyst with the addition of an organic diluent.

7. As a new compound the ar-2-ethoxytetrahydronaphthalene of the probable formula:

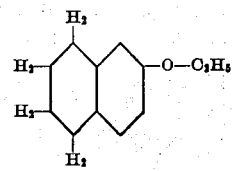

representing an easily mobile oil boiling at 123° under a pressure of 8 mm.

8. As new compounds the ar-2-alkoxy-tetrahydronaphthalenes corresponding to the general formula:

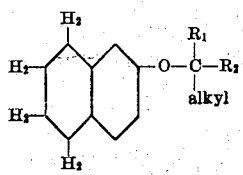

wherein $R_1$ and $R_2$ mean hydrogen or alkyl groups, which compounds are colorless substances of a relatively low melting point, soluble in organic solvents, insoluble in water.

9. As a new compound, the ar-2-isopropyloxytetrahydronaphthalene of the formula:

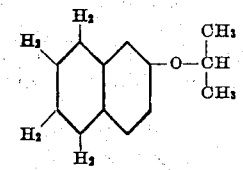

being a clear oil of an aromatic odor and boiling under a pressure of 9 mm at 135 to 136° C.

10. As a new compound, the ar-2-isobutyloxy-tetrahydronaphthalene of the formula:

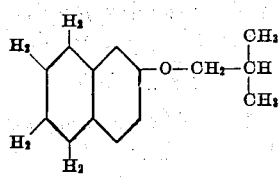

being a clear oil of an aromatic odor and boiling under a pressure of 12 mm at 146 to 148° C.

ERNST KORTEN.